(12) United States Patent
Hänni et al.

(10) Patent No.: US 11,192,197 B2
(45) Date of Patent: Dec. 7, 2021

(54) HOB PEELING TOOL AND METHOD FOR HARD-FINE MACHINING OF PRE-TOOTHED WORKPIECES

(71) Applicant: REISHAUER AG, Wallisellen (CH)

(72) Inventors: Florian Hänni, Wallisellen (CH); Frank Haufe, Volketswil (CH); Roger Kirsch, Karlsbad (DE); Hartmut Marx, Wallisellen (CH)

(73) Assignee: REISHAUER AG, Wallisellen (CH)

( * ) Notice: Subject to any disclaimer, the term of this patent is extended or adjusted under 35 U.S.C. 154(b) by 0 days.

(21) Appl. No.: 16/342,079

(22) PCT Filed: Oct. 10, 2017

(86) PCT No.: PCT/EP2017/075792
§ 371 (c)(1),
(2) Date: Apr. 15, 2019

(87) PCT Pub. No.: WO2018/073047
PCT Pub. Date: Apr. 26, 2018

(65) Prior Publication Data
US 2019/0255635 A1    Aug. 22, 2019

(30) Foreign Application Priority Data
Oct. 21, 2016  (CH) .................................. 1412/16

(51) Int. Cl.
*B23F 21/06* (2006.01)
*B23F 5/16* (2006.01)
(Continued)

(52) U.S. Cl.
CPC .............. *B23F 5/163* (2013.01); *B23C 5/207* (2013.01); *B23F 21/06* (2013.01); *B23F 21/063* (2013.01);
(Continued)

(58) Field of Classification Search
CPC ...... B23F 21/163; B23F 21/06; B23F 21/063; B23F 21/103; B23C 2200/366; B23C 2200/246
See application file for complete search history.

(56) References Cited

U.S. PATENT DOCUMENTS

| 5,876,160 A | 3/1999 | Johnson |
| 8,950,301 B2 | 2/2015 | Marx et al. |
| (Continued) | | |

FOREIGN PATENT DOCUMENTS

| CN | 104416208 A | 3/2015 |
| CN | 105209201 A | 12/2015 |
| (Continued) | | |

OTHER PUBLICATIONS

International Search Report in International Application No. PCT/EP2017/075792, dated Dec. 20, 2017.

(Continued)

*Primary Examiner* — Alan Snyder
(74) *Attorney, Agent, or Firm* — Sughrue Mion, PLLC

(57) ABSTRACT

A tool for hob peeling rotating workpieces having pre-machined teeth comprises a gear-wheel shaped main body and tooth-shaped cutting inserts (1.2) which at the end face in the region of the tip circle are disposed on the main body. Each cutting insert comprises at least one cutting tooth. The cutting tooth forms a cutting edge (6) which runs at least along one of the flanks of the cutting tooth, and a cutting face and a clearance face. The cutting face along the cutting edge is provided with a cutting face chamfer (7) which in relation to the cutting face (5.5) runs so as to be inclined by a chamfer angle. The chamfer angle varies along the cutting edge. Moreover, the cutting edge is rounded by a radius.

31 Claims, 9 Drawing Sheets

(51) Int. Cl.
  *B23C 5/20* (2006.01)
  *B23F 21/10* (2006.01)
(52) U.S. Cl.
  CPC .... *B23F 21/103* (2013.01); *B23C 2200/0416* (2013.01); *B23C 2200/206* (2013.01); *B23C 2200/366* (2013.01); *B23C 2210/445* (2013.01)

(56) References Cited

U.S. PATENT DOCUMENTS

| | | | |
|---|---|---|---|
| 9,981,330 | B2 * | 5/2018 | Sjoo ................... B23F 21/066 |
| 2015/0063927 | A1 | 3/2015 | Sjoo |
| 2015/0314382 | A1 | 11/2015 | Sobczyk |
| 2016/0121414 | A1 | 5/2016 | Ochi et al. |

FOREIGN PATENT DOCUMENTS

| | | |
|---|---|---|
| DE | 243514 C | 2/1912 |
| DE | 1 627 379 A1 | 5/1970 |
| DE | 103 08 234 A1 | 9/2004 |
| DE | 20 2009 009 518 U1 | 10/2010 |
| DE | 10 2012 011 956 B3 | 12/2013 |
| DE | 10 2015 106 354 A1 | 6/2016 |
| EP | 0 132 350 B1 | 10/1988 |
| EP | 0 314 647 A2 | 5/1989 |
| EP | 1125667 A2 * | 8/2001 ........... B23C 5/1036 |
| EP | 2 570 218 A2 | 3/2013 |
| EP | 2 596 893 A1 | 5/2013 |
| WO | 2015/036519 A1 | 3/2015 |
| WO | 2018/010838 A1 | 1/2018 |

OTHER PUBLICATIONS

Written Opinion in International Application No. PCT/EP2017/075792, dated Dec. 20, 2017.
International Preliminary Report on Patentability issued from the International Bureau in counterpart International Application No. PCT/EP2017/075792, dated Apr. 23, 2019.
Communication dated Feb. 3, 2020, from The China National Intellectual Property Administration in Application No. 201780065340.4.
Christoph Kühlewein, "Untersuchung und Optimierung des Wälzschälverfahrens mit Hilfe von 3D-FEM-Simulation", (Examination and Optimization of the hob peeling method with the aid of 3D-FEM simulation), Research Report vol. 174, wbk Institut der Universität, Karlsruhe, 2013, pp. 1-51, 109-112, 146-149, 155-176.

* cited by examiner

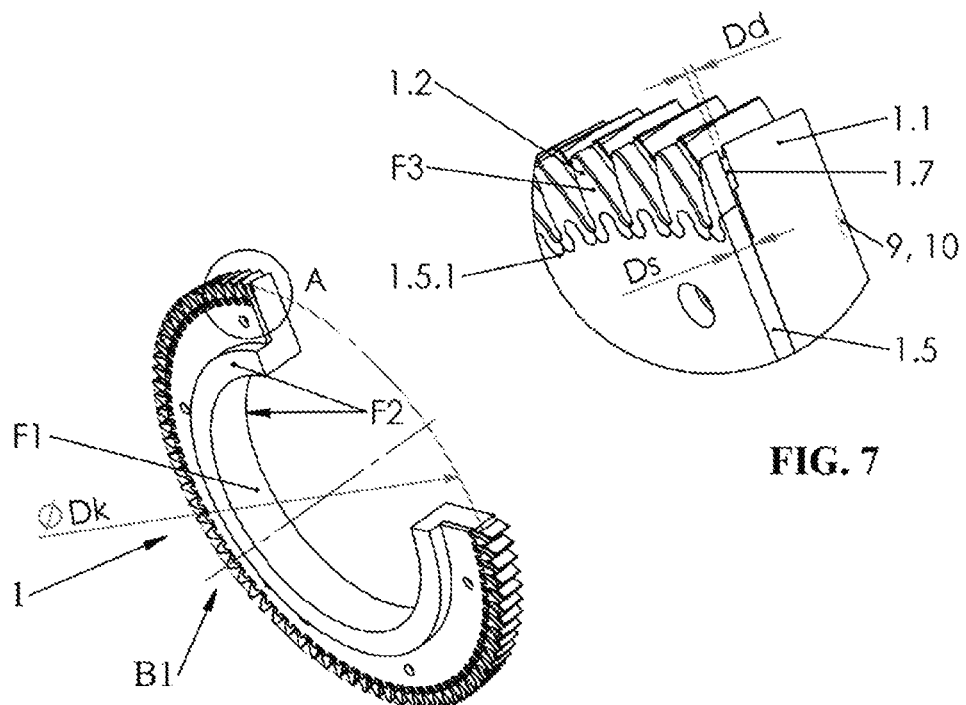
FIG. 6
FIG. 7
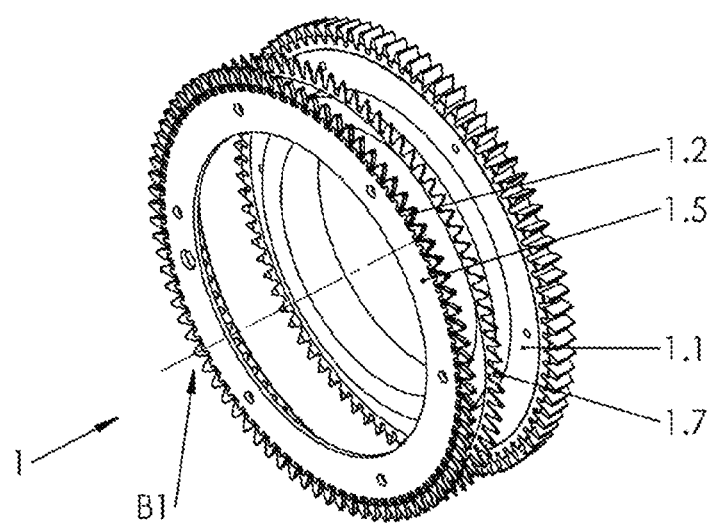
FIG. 8

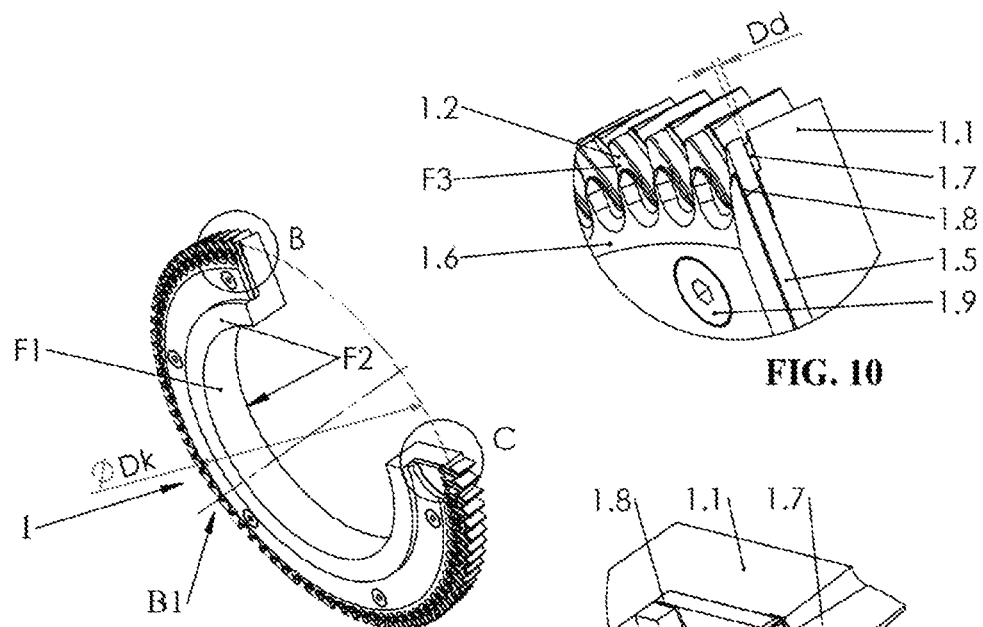
FIG. 9
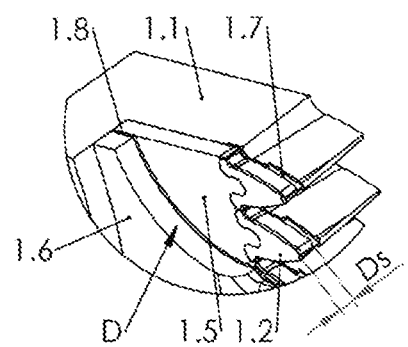
FIG. 10
FIG. 11
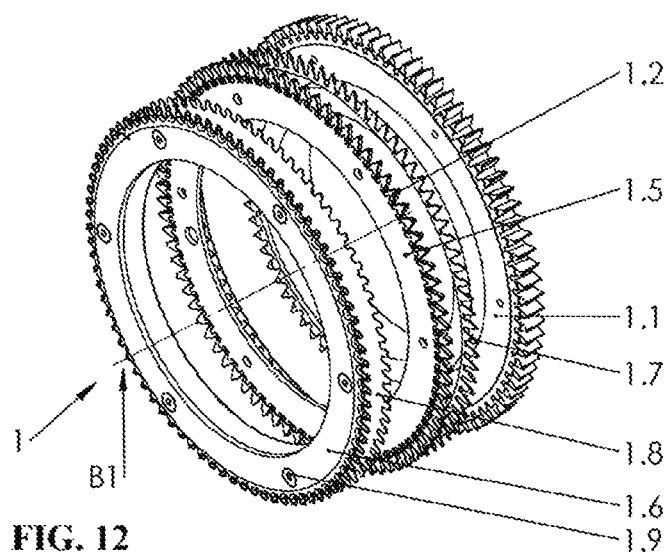
FIG. 12

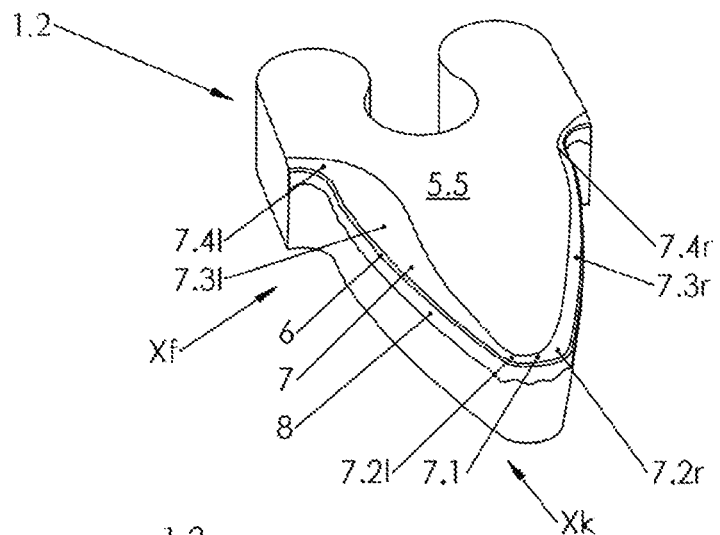
FIG. 16
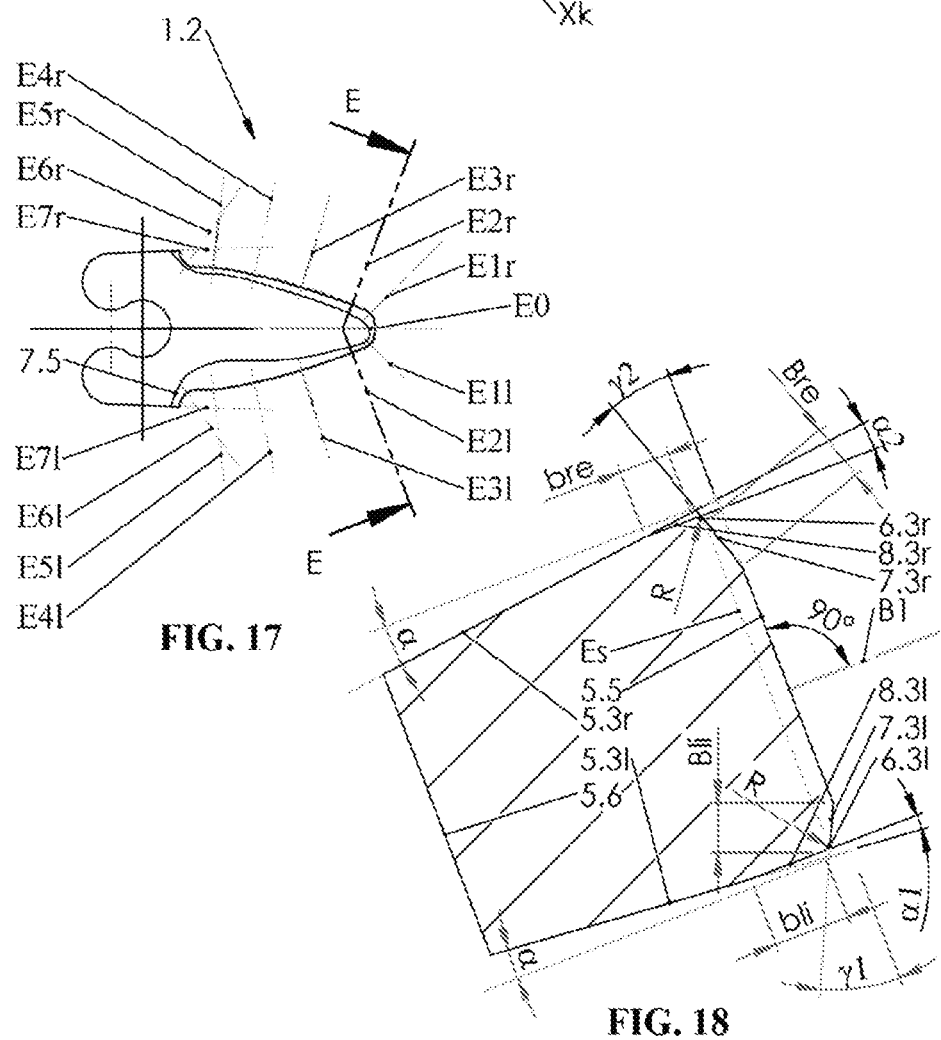
FIG. 17
FIG. 18

HOB PEELING TOOL AND METHOD FOR HARD-FINE MACHINING OF PRE-TOOTHED WORKPIECES

CROSS REFERENCE TO RELATED APPLICATIONS

This application is a National Stage of International Application No. PCT/EP2017/075792, filed on Oct. 10, 2017, which claims priority from Swiss Patent Application No. 1412/16, filed on Oct. 21, 2016.

TECHNICAL FIELD

The invention relates to a tool for hob peeling rotating and in particular hardened or high-tensile workpieces having pre-machined teeth, to a method for producing such a tool, and to a method for the hard fine machining by hob peeling while using such a tool.

PRIOR ART

In this document, terms such as cutting edge (German: Schneide), main cutting edge (German: Hauptschneide), secondary cutting edge (German: Nebenschneide), cutting face (German: Spanfläche), cutting face chamfer (German: Spanflächenfase), clearance face (German: Freifläche), clearance face chamfer (German: Freiflächenfase), cutting wedge (German: Schneidkeil), cutting angle (German: Spanwinkel), chamfer cutting angle (German: Fasenspanwinkel), etc., are used in accordance with the standards DIN 6580:1985-10 and DIN 6581:1985-10. Likewise, movements such as cutting movement (German: Schnittbewegung), feeding movement (German: Vorschubbewegung), and effective movement (German: Wirkbewegung), and reference planes such as tool reference plane (German: Werkzeugbezugsebene), cutting plane (German: Schneidenebene), wedge measurement plane (German: Keilmessebene), and operating plane (Arbeitsebene), are used in accordance with said standards.

Hob peeling as a gear cutting method has been known since at least 1910 and is thus a very old method. A first description of the method is to be found in DE 243514 C. The hob peeling method is a continuous chip removing method for producing axially symmetrical periodic structures in which gear-wheel type tools are used. The teeth of these tools have cutting edges on their end faces. The tool and the workpiece are received on rotating spindles. The rotation axes of the tool and of the workpiece are disposed in a skewed manner. The rolling movement that is typical of the method is implemented by coupling the rotating movements of the tool and of the workpiece about the rotation axes. During hob peeling, a cutting movement can be generated both in the forward and in the backward direction on account of this rolling movement and of a feeding movement of the tool or of the workpiece along the workpiece axis. External toothings as well as internal toothings can be machined by this chip-removing method.

A disadvantage of the hob peeling method lies in the complex production and the rapid wear of the complex and workpiece-specific tool. In order for post-machining of the tool to be facilitated, a hob peeling tool having replaceable blade bars is proposed in U.S. Pat. No. 8,950,301 B2. The blade bars are held in the main body by releasable fastening means and can be individually post-machined.

A hob peeling tool having replaceable cutting elements is also known from DE 10 2012 011 956 B3. The cutting elements are individually connected to a tool receptacle. A further hob peeling tool having replaceable cutting elements is disclosed in US 2015/0063927 A1. The tooth-shaped cutting elements are individually screw-fitted to a main body.

In the case of the tools mentioned, the accuracy of the position of the cutting edges is limited by the separate installation of the individual cutting elements. Moreover, the tools mentioned are in each case very complex in terms of the production and construction thereof.

It has been recognized in US 2015/0314382 A1 that in hob peeling, by virtue of the path movement of the tool relative to the workpiece, different cutting angles and different clearing angles arise at each point in time of the engagement. According to this document, the cutting angle during the cutting engagement changes steadily due to the process and can even assume high negative values of up to −50°. In order for unfavourable cutting conditions to be avoided, the document proposes a method for determining a clearance face contour, but does not offer any details pertaining to the position and the design embodiment of the cutting face.

The dissertation by Christoph Kühlewein, Untersuchung and Optimierung des Wälzschälverfahrens mit Hilfe von 3D-FEM-Simulation (Examination and Optimization of the hob peeling method with the aid of 3D-FEM simulation), Research Report Volume 174, wbk Institut der Universität Karlsruhe, 2013, pages 8-51, 109-112, 149-146, 155-176, discusses comprehensively the process-typical conditions in the formation of chips and the disadvantages of the hob peeling technology that result therefrom.

In hob peeling, the chips in an interlinked manner are composed of the incoming flank, of the tip, and of the outgoing flank, and thus form a triple-flank chip, as it is known in gear-making technology, the chip being additionally characterized by method-typical disturbances in the creation of the chip. During the cutting procedure, the cutting edge contacts the workpiece surface along a line. Considering a multiplicity of points on the cutting edge, the cutting edge can be sub-divided into individual regions and then be considered in a pointwise manner. The respective movement path can be represented for each of these points on the cutting edge. At each point on the cutting edge the directional vectors of the cutting movement and the cutting face of the cutting edge form a different cutting angle, which moreover varies in the course of the cutting movement. That is to say that the cutting angle varies in a spatial manner along the cutting edge, on the one hand, and in a temporal manner during the movement of the cutting edge through the tooth gap, on the other hand.

The chip formation during the cutting procedure is thus not uniform such as in the case of turning, for example, but each cutting edge portion is subjected to stress that is different and is variable over time. This intensely dissimilar stress on the various cutting edge portions is particularly disadvantageous in hard fine machining, given the comparatively high machining forces of the latter.

SUMMARY OF THE INVENTION

In a first aspect, it is an object of the present invention to provide a hob peeling tool which is suitable for the ultra-precise hard fine machining of workpieces having pre-machined teeth and which can be manufactured in a simple yet nevertheless highly precise manner.

The invention thus makes available a tool for hob peeling workpieces having pre-machined teeth. The tool comprises a gear-wheel shaped main body which defines a tool axis and which on an end face defines a tip circle, and one or a plurality of cutting inserts which are disposed on the main body at the end face in the region of the tip circle. Each of the cutting inserts has at least one cutting tooth. The cutting tooth forms a cutting edge which runs at least along one of the flanks of the cutting tooth. Accordingly, the cutting tooth has a cutting face associated with the cutting edge, and a clearance face associated with the cutting edge. Reference is made to the DIN standards mentioned with regard to the terms cutting edge (German: Schneide), cutting face (German: Spanfläche), and clearance face (German: Freifläche). In particular, the cutting inserts are made from a hard and wear-resistant material.

According to the invention, the cutting face of the cutting tooth is provided with a cutting face chamfer which runs along the cutting edge and in relation to the cutting face is inclined by a chamfer angle, wherein said chamfer angle varies along the cutting edge (i.e. the chamfer angle is not constant over the entire length of the cutting edge, but varies in at least one section of the cutting edge). In particular, this chamfer angle varies along at least one flank of the cutting tooth. The variation is preferably continuous, that is to say without steps.

The chamfer angle herein is considered to be variable when said chamfer angle along the length of the cutting edge, and in particular along the length of one flank of the cutting tooth, varies by at least 1°. In some embodiments, the chamfer angle along the length of the cutting edge, or along the length of the flank, respectively, can vary by more than 2°, or even by more than 5°.

In that a cutting face chamfer having a variable chamfer angle is provided on the cutting edge it becomes possible for the chip-removing conditions to be influenced in a targeted manner at each point of the cutting edge by selecting a suitable chamfer angle. It becomes possible, in particular, for more uniform chip-removing conditions to be achieved along the cutting edge than is the case when no cutting face chamfer is present. More detailed considerations pertaining thereto will be discussed hereunder in the context of FIGS. 3 to 5.

The cutting face chamfer is preferably configured sufficiently wide such that the chip that is created can run off exclusively on the cutting face chamfer and not on the cutting face as defined according to DIN. On account thereof, the cutting face loses the character thereof that is assigned thereto by the DIN standard and continues to be relevant only as a reference face for conceiving and making the chamfers on the cutting face. The spatial orientation of the cutting face is thus no longer primarily relevant to the cutting process, but the orientation of the cutting face chamfer is. Accordingly, the cutting angle (which according to DIN is measured relative to the cutting face) is also no longer relevant, but the chamfer cutting angle (that is to say the cutting angle measured relative to the cutting face chamfer) is. Said chamfer cutting angle will hereunder also be referred to as the de-facto cutting angle.

In order to ensure that the chip in the hard fine machining runs off exclusively by way of the cutting face chamfer, it is advantageous for the cutting face chamfer to have a width (measured in the normal plane of the tool cutting edge) of at least 50 micrometres, preferably at least 100 micrometres, or at least double the chip thickness that is to be mathematically expected.

The cutting edge preferably has portions along both the right flank as well as the left flank. On account thereof, machining of both flanks of the workpiece toothing in the same operating step is enabled. It is preferable herein for a cutting face chamfer on the cutting edge to be configured both along the left flank as well as along the right flank. The chamfer angle of the cutting face chamfer in this instance varies along at least one of these flanks, while said chamfer angle of the cutting face chamfer on the other flank can possibly be constant. However, embodiments in which only single-flank machining is carried out by the tool are also conceivable. It is sufficient in this case for one cutting face chamfer to be provided along this flank. Moreover, the cutting tooth can have a cutting edge region on the tooth tip and optionally further cutting edge regions on the tooth base, and cutting face chamfers can also be provided in these regions. A continuous cutting edge which runs without interruptions from the tooth base along the left flank by way of the tooth tip and the right flank to the next tooth base is preferably configured on the cutting tooth. In this instance, the cutting face chamfer preferably runs continuously at least along the left flank, the tooth tip, and the right flank.

Depending on the workpiece geometry, the tool geometry, and the kinematic settings of the machine, it can be particularly advantageous for the chamfer angle along the cutting edge to continuously increase or continuously decrease along at least one of the flanks, for example, to increase or decrease by at least 20%, from the tooth tip to the tooth base. Should the cutting edge also extend across the other flank, the chamfer angle along the second flank can be constant, said chamfer angle can vary in the same way as on the first flank (that is to say likewise continuously increase or decrease, respectively), said chamfer angle can vary in the opposite manner, or said chamfer angle can vary in any other manner. As has already been explained, the type of variation of the chamfer angle that is optimal in an individual case depends on various parameters, such as on the workpiece geometry, the tool geometry, and kinematic settings.

The width of the cutting face chamfer can also vary along the cutting edge. This will often be necessitated already by reasons of production technology in that the chamfer angle of the cutting face chamfer varies along the cutting edge. Specifically, from the point of view of the user it can be desirable that the cutting edge at least along one tooth flank always lies in a single cutting edge plane which runs parallel with the cutting face at a fixed distance therefrom. However, the width of the cutting face chamfer along this tooth flank in such a situation by necessity is larger the smaller the chamfer angle relative to the cutting face. However, it is also conceivable for a fixed chamfer width of the cutting face chamfer to be provided, and for only the chamfer angle of the cutting face chamfer to be allowed to vary. In this case, however, the cutting edge will not lie in a single plane but assume a curved spatial profile.

Depending on the workpiece geometry, the tool geometry, and the kinematic settings of the machine, it can be particularly advantageous for the width of the cutting face chamfer along the cutting edge to continuously increase or continuously decrease along at least one of the flanks from the tooth tip to the tooth base. The width of the cutting face chamfer on the other flank can be constant or can vary in any manner.

In order for the production of the cutting edge to be simplified and for the wedge angle to be enlarged in a localized manner (in the direct proximity of the cutting edge), the clearance face of the cutting tooth along the cutting edge can be provided with a clearance face chamfer. A clearance face chamfer herein can be provided only along a portion of the cutting edge, or along the entire cutting edge. The clearance face chamfer can have a constant chamfer angle (measured in the normal plane of the cutting edge as an angle between the clearance face and the clearance face chamfer), or respective chamfer angles can vary along the cutting edge.

The cutting edge of the cutting tooth can be rounded by a radius. In this case, it is advantageous for the radius to correspond to between 10% and 40% of the expected chip thickness. In absolute numbers, the radius will advantageously be at least 15 micrometres, in practice often 15 to 50 micrometres. Said radius can vary along the cutting edge and in particular increase from the tooth base to the tooth tip.

The cutting faces of all cutting teeth of the tool are preferably disposed in one common plane that is fixed in relation to the tool, wherein the common plane runs so as to be orthogonal to the tool axis. Since the chip runs off substantially exclusively by way of the cutting face chamfer, and the cutting face no longer participates in the chip formation, the cutting face becomes a pure reference face, as has already been described above. The spatial orientation of this reference face can therefore be freely chosen. The selection of this orientation to be orthogonal to the tool axis enables an extremely simple production and assembly of the cutting inserts. All cutting inserts can be disposed in one common plane, be aligned in a very simple manner in relation to this plane, and be conjointly assembled, and a plurality of cutting teeth can be configured on a single cutting insert.

In particular, the tool herein can be helically toothed, that is to say that the teeth of the gear-wheel shaped main body and the cutting teeth of the cutting inserts do not run parallel with the tool axis but inclined in relation to the tool axis. As is opposed to the prior art relating to helically toothed tools, the cutting faces of all cutting teeth in this case nevertheless preferably lie in one common plane, while the cutting faces in the prior art are typically disposed so as to be mutually offset in a step-like manner.

The hard and wear-resistant cutting inserts are preferably bonded to the softer main body in a materially integral manner, forming a connection layer, for example, by adhesive bonding or soldering/brazing, or other modern or future connecting technologies, respectively. This enables the cutting inserts to be fixed in a firm manner. These cutting inserts are preferably finally machined on the tool, once said cutting inserts have been integrally bonded to the main body and before said cutting inserts are employed in the machining of the workpiece.

In order for vibrations by virtue of variable machining forces to be damped, it is advantageous for the connection layer in the region of the tooth tips of the cutting teeth to be configured so as to be thicker, in particular by 10 to 200 micrometres, more particularly 20 to 100 micrometres, particularly preferably by 30 to 50 micrometres thicker, than in the region of the tooth bases. The connection layer in the region of the tooth tips in this case forms a damping layer which contributes towards reducing vibrations directly at the source.

In order for the damping layer to be configured in a simple manner, the main body in the region of the tip circle thereof can have an end-side depression, for example in the form of a turned feature, wherein the depression has a corresponding depth of 10 to 200 micrometres, in particular 20 to 100 micrometres, particularly preferably 30 to 50 micrometres, and preferably extends up to the outermost periphery of the main body. The connection layer in this instance extends into the region of the depression, therein forming the damping layer.

In order for the cutting elements to be positioned on the main body in a simple manner, the tool can optionally comprise a positioning disk, positioning elements being configured on the external diameter of the latter. The cutting inserts in this instance are disposed at the external circumference of the positioning disk, said cutting inserts on the inside being provided with holding elements which are designed so as to be complementary to the positioning elements and in relation to a radial and/or tangential direction establish preferably a form-fit, or else only a simple positioning, respectively, between said positioning disk and the cutting inserts. In this way, the cutting inserts can be prepositioned in a very simple manner prior to the materially integral connection being established. Alternatively, positioning elements of this type can also be configured on the main body; the additional positioning disk could thus be dispensed with. However, using current manufacturing methods, this additional disk can be produced in a very cost-effective manner, thus also enabling the hob peeling tool to be produced in a more cost-effective manner.

To this extent, the present invention also makes available a tool for hob peeling rotating workpieces having pre-machined teeth, said tool comprising:
  a gear-wheel shaped main body which defines a tool axis and which on an end face defines a tip circle; and
  one or a plurality of cutting inserts which at the end face in the region of the tip circle are disposed on the main body, wherein each of the cutting inserts has at least one cutting tooth,
  wherein the cutting inserts are integrally bonded, preferably adhesively bonded, to the main body;
  wherein the tool comprises positioning elements which are disposed on an external circumference of an additional positioning disk or on the gear-wheel shaped main body;
  wherein the cutting inserts are disposed at the external circumference of the tool; and
  wherein the cutting inserts on the inside are provided with holding elements which are designed so as to be complementary to the positioning elements and in relation to a radial and/or tangential direction establish a positioning or a form-fit between the positioning elements and the cutting inserts.

The positioning disk in the axial direction (that is to say when measured along the tool axis) is preferably smaller than or at maximum of equal thickness as the cutting inserts.

In order for the fastening of the cutting inserts to be improved, the tool can have a gear-wheel shaped auxiliary disk, wherein the cutting inserts are disposed axially between the main body and the auxiliary disk and are integrally bonded, preferably adhesively bonded or soldered/brazed, respectively, to both the main body as well as to the auxiliary disk.

In advantageous embodiments, the cutting inserts in each case have a plurality of teeth, for example 2, 3, 4, 5, 6, 7, or more teeth. Said cutting inserts preferably have a circular-arc shape, wherein the cutting teeth are disposed on the cutting insert at its external circumference along a circular arc. Overall, the cutting inserts in this instance form an annulus on the main body.

In another advantageous embodiment, the tool has a single annular cutting insert, wherein the cutting teeth are disposed on the cutting insert at its external circumference.

The hard and wear-resistant cutting inserts are preferably made from one of the following hard materials: hard metal with or without a coating, cubic boron nitride (CBN), polycrystalline cubic boron nitride (PCBN), or polycrystalline diamond (PCD). The invention can also be applied when further hard materials for tools for hob peeling workpieces having pre-machined teeth become available in the future, or when respective hard materials are applied to the main body by means of 3D printing technology, respectively.

An RFID module can be disposed in or on the main body of the hob peeling tool. An identification code for unequivocally identifying the hob peeling tool can be stored in and retrievable in a non-contacting manner from the memory of this module. This enables tool-specific data relating to the tool geometry, including data pertaining to the geometry of the cutting face chamfer, to be retrieved from a database, or to be modified in said database, respectively. Alternatively, such data can also be stored directly in the memory and be retrievable in a non-contacting manner from the memory and optionally be modifiable in the memory. This geometry data is of great importance for controlling the machine. On account thereof, any complex and error-prone input and/or modification of the geometry data by hand, or any transmission from a separate data carrier which can be easily lost or mistaken, can be dispensed with.

Furthermore, at least one sensor for detecting operating parameters such as temperature, vibrations, or impact sound can be disposed in said RFID module, wherein said sensor in this instance can likewise be accessible and optionally actuatable in a non-contacting manner.

In terms of the design and attachment of suitable RFID modules and of reliable non-contacting transmission of signals, reference is made to WO 2015/036519 A1.

In one advantageous method for producing a tool of the type described above, the cutting inserts are made so as to be oversized by preferably 100 to 500 micrometres in terms of the final contour of said cutting inserts. The cutting inserts at the end face are integrally bonded to the main body and are subsequently finally machined. The final machining can relate in particular to the reference faces or base faces for concentricity and axial run-out on the main body, and to the cutting faces including cutting face chamfers, to clearance faces including clearance face chamfers, and to radii on the cutting inserts. In particular, the cutting face chamfers and likewise the radii, if present, and optionally clearance faces including clearance face chamfers, are preferably machined.

In a method according to the invention for fine machining a workpiece having pre-machined teeth, a hob peeling procedure is carried out using a tool of the type described above. To this end, the workpiece is rotated about a workpiece axis, the tool is rotated in a rolling engagement with the workpiece about a tool axis that in relation to the workpiece axis is aligned in a skewed manner, and the tool is fed axially in a direction that is parallel or antiparallel to the workpiece axis. As has already been set forth above, the cutting face of each cutting tooth along the cutting edge is provided with a cutting face chamfer which in relation to the cutting face runs so as to be inclined at a chamfer angle, wherein the chamfer angle varies along the cutting edge. The workpiece and the tool are engaged during the passage of the cutting edge of a cutting tooth through the workpiece, the chips which form during the passage of the cutting edge of a cutting tooth through a tooth gap of the workpiece running off exclusively by way of the cutting face chamfer.

During the passage of the cutting edge of a cutting tooth through a tooth gap of the workpiece, at each point of the cutting edge a chamfer cutting angle in relation to the cutting face chamfer is formed, the chamfer cutting angle being variable over time. This chamfer cutting angle acts as a de-facto cutting angle. The chamfer angle along the cutting edge can be configured so as to vary in such a manner that a reference value, for example a mean value (optionally weighted) or a numeric maximum value of the chamfer cutting angle that is determined at an in each case fixed point on the cutting edge, throughout the passage of the cutting edge through the tooth gap varies to a lesser extent along the cutting edge than would be the case for the corresponding reference value for the cutting angle if no cutting face chamfer was present and the chip was to run off directly by way of the cutting face.

The variation of the chamfer angle can be selected such that the reference value even is approximately constant. A non-weighted or a weighted mean value, in the case of which, for example, the entry of the cutting edge into the material to be cut is weighted to a greater extent than the exit of said cutting edge, can be used as reference value. Furthermore, the width of the cutting face chamfer can also be designed in such a manner that such a reference value varies as little as possible along the cutting edge.

The chamfer angle along the cutting edge is preferably configured so as to vary in such a manner that the numeric maximum value of the chamfer cutting angle along the entire length of the cutting edge is negative and lies in the range from −5° to −40°, preferably −20° to −35°.

The cutting face chamfer in the entire profile of the cutting edge preferably has a width which is larger than the maximum thickness of the chip that forms during the passage of the cutting edge through a tooth gap of the workpiece. The width of the cutting face chamfer along the entire length of the cutting edge is preferably at least double the maximum chip thickness. Thereby it is ensured that the chip runs off exclusively by way of the cutting face chamfer and not by way of the actual cutting face.

The tool of the type mentioned above is particularly suitable for the hard fine machining of workpieces having pre-machined teeth by hob peeling, that is to say for machining workpieces having pre-machined teeth that either have been previously hardened or have been made from a high-tensile material such as, for example, heat-treated steel. The tool according to the invention can be employed both for machining in the forward and in the backward direction, that is to say that the axial feed of the workpiece in relation to the tool can be performed in a direction which corresponds to the axial component of the cutting speed by virtue of the rolling movement, or in the direction that is opposite thereto.

BRIEF DESCRIPTION OF THE DRAWINGS

In the following, preferred embodiments of the invention will be described with reference to the drawings which serve only for the purpose of explanation and are not to be interpreted as limiting. In the drawings:

in FIGS. 5($b$)-5($d$)

the variation of the original cutting angle γ and of the chamfer cutting angle as a function of the rolling angle ξ.

FIG. 6 shows a perspective partial view of a tool for hob peeling;

FIG. 7 shows an enlarged detailed view of FIG. 6 in the region A;

FIG. 8 shows an exploded view of the tool of FIG. 6;

FIG. 9 shows a perspective partial view of a complete tool having an additional auxiliary disk and a second connection layer;

FIG. 10 shows an enlarged detailed view of FIG. 9 in the region B;

FIG. 11 shows an enlarged detailed view of FIG. 9 in the region C;

FIG. 12 shows an exploded view of the tool of FIG. 9;

FIG. 16 shows a perspective view of a cutting insert comprising a single tooth, wherein a cutting face chamfer having an increasing width is provided along one tooth flank, and a cutting face chamfer having a decreasing width is provided along the other tooth flank, and clearance face chamfers are also provided;

FIG. 17 shows a plan view of the cutting face of a cutting insert as per FIG. 16;

FIG. 18 shows an enlarged sectional view of the cutting insert in the plane E-E of FIG. 17, enabling in particular the cutting face chamfer and the clearance face chamfer to be better seen;

DESCRIPTION OF PREFERRED EMBODIMENTS

As has already been explained above, references to the cutting geometry in the following are performed in a manner analogous to that of DIN 6580 and DIN 6581. These standards differentiate between a cutting movement (without any consideration of the feed) and an effective movement (with consideration of the feed). The standards were originally developed for describing simple chip-removal situations such as arise in turning or milling, for example. The differentiation between a cutting movement and an effective movement is typically possible without any problems in the case of such methods. By contrast, the hob peeling method is an extremely complex method which apart from a rolling movement also comprises axial feeding of the tool or of the workpiece in a manner parallel or antiparallel with the workpiece axis. In the case of hob peeling, the axial feed typically has a relatively great influence on the chip-removal procedure. Therefore, the rolling movement should not be viewed in isolation from the axial feeding movement. For this reason, the following convention is used: said axial feed is not to be considered as a feed in the sense of the DIN standards mentioned; rather, it is to be considered as part of the cutting movement in the sense of the DIN standards. Thus, in the following the movement which is produced from superimposing the rolling movement with the axial feeding movement is considered to be the cutting movement in the sense of the DIN standards. As opposed thereto, any potential radial infeed movement by the tool or by the workpiece in a radial direction that is perpendicular to the workpiece axis is not considered to be part of the cutting movement.

Identical reference signs are used in all figures for same or equivalent faces, cutting edges, chamfers, or other elements, respectively.

Figure 1:
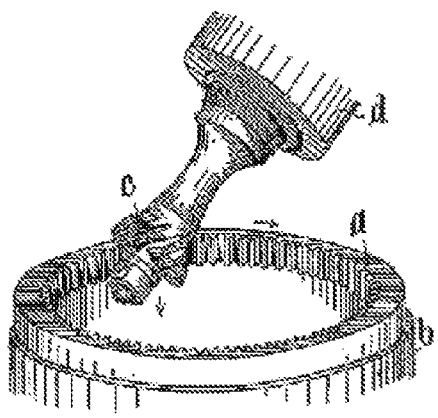
FIG. 1 shows a schematic sketch of principle of hob peeling in the prior art (sourced from DE 243514 C)

FIG. 1 shows a schematic sketch of principle of the hob peeling method for a workpiece having an internal toothing, said sketch having been sourced from DE 243514 C. Said document originates from an application filed in the year 1910. The document illustrates the basic principle of hob peeling. The workpiece "a", having an internal toothing, is rotated about a workpiece axis by way of a rotatable spindle on the bed "b". The tool "c" in the spindle "d" is rotated about a tool axis, the tool axis being skewed in relation to the workpiece axis (in the present example, at an angle of 45°). The tool is simultaneously fed along the workpiece axis. The teeth of the tool have a helix angle which is selected such that the teeth of the tool and of the workpiece mesh. In the present example, the workpiece is internally straight-toothed, and the helix angle on the tool is correspondingly 45°. Each of the teeth of the tool at the end face of the latter forms a continuous cutting edge which extends along the two tooth flanks and the tooth tip.

Figure 2:
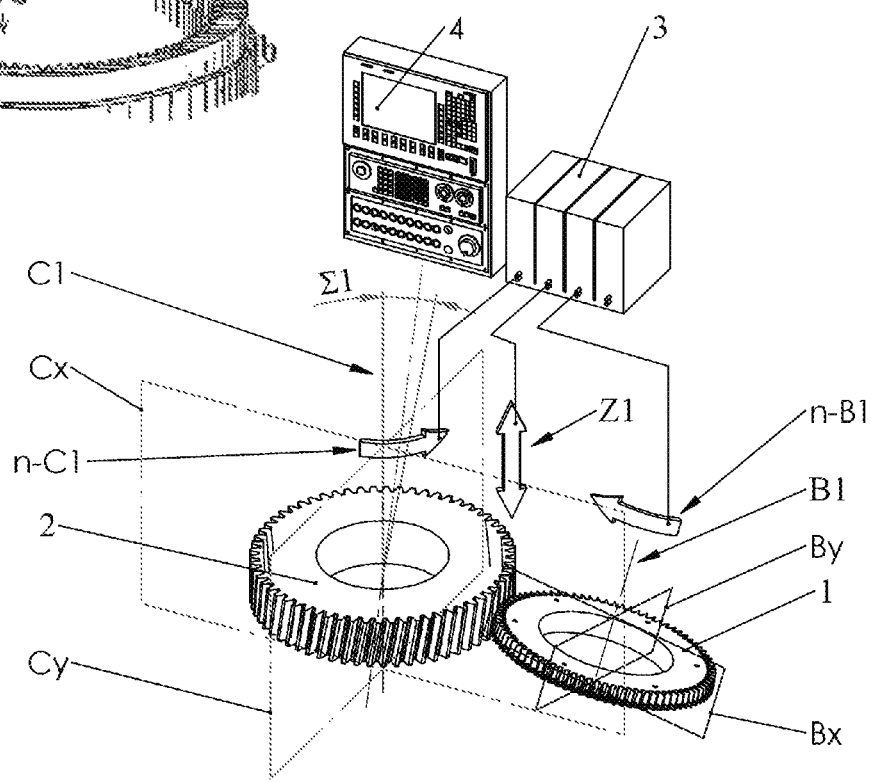
FIG. 2 shows a schematic sketch of principle of the hob peeling method with the associated workpiece and tool.

FIG. 2 shows a further schematic sketch pertaining to hob peeling, in this example for a workpiece with external toothing. The workpiece 2 is rotated about the workpiece axis C1 (rotation frequency n-C1). The tool 1 is rotated about the tool axis B1 (rotation frequency n-B1). The tool axis B1 is tilted in relation to the workpiece axis C1. This tilt can be described by at least one angle Σ1. Initially, the workpiece axis and the tool axis can be imagined to be mutually parallel. A workpiece reference plane Cx and a tool reference plane Bx in this imaginary situation include both the workpiece axis C1 as well as the tool axis B1. A second workpiece reference plane Cy, perpendicular to the first-mentioned plane Cx, includes the workpiece axis C1. A second tool reference plane By includes the tool axis B1 and is perpendicular to the first tool reference plane Bx. In the initial situation, the planes Cx and Bx are congruent, and the planes Cy and By are parallel. The tool axis B1 is now tilted at least by a tilt angle Σ1 in the reference plane Cx. The planes Cx and Bx thereafter continue to be congruent, while the planes Cy and By are mutually tilted by Σ1. On account of the tilt, a relative velocity along the workpiece axis, that is to say a velocity component which enables a cut in the first place, is created during rolling. If required, the tool axis B1 can subsequently be tilted by a further tilt angle in the reference plane By. The effect of the second tilt is equivalent to a so-called cutting face offset in which, however, the planes Cx and Bx are spaced apart. Said second tilt is used in order for the clearance angle situation to be increased or decreased. Such tilting is in part also required in order for collisions between the tool or the tool holder and the workpiece, the machine, or other elements, to be avoided. The rotations of the tool 1 and of the workpiece 2 are synchronized by means of a CNC control unit 3. Additionally, an axial feed Z1 is performed parallel or antiparallel with the workpiece axis C1. The settings therefor are performed by the operator at the operator panel 4. The respective hob peeling machine, which includes further axes and accessories, is not illustrated.

FIG. 3 in part (a) illustrates a single cutting tooth 1.2.1 of a hob peeling tool that will be explained in more detail hereunder. The cutting tooth defines a cutting face 5.5 and a clearance face 5.3, a cutting edge 6 being configured therebetween. The cutting edge 6 here extends continuously from the tooth base on the left side of the tooth by way of the left flank, the tooth tip, and the right flank, to the tooth base on the right side of the tooth. Three points on the cutting edge S1, S2, S3 are marked on the cutting edge 6 along the left flank.

The parts (b) to (d) of FIG. 3 illustrate in a highly schematic and an exemplary manner the variation of the cutting angle when the cutting tooth passes through a tooth gap of a workpiece having pre-machined teeth. It is assumed herein that the left flank on which the points S1 to S3 are marked forms the incoming flank. In this instance, the point S1 typically engages with the workpiece before the point S2; the point S3 follows only thereafter.

Part (b) in a qualitative manner shows a curve describing the cutting angle at the point S1. The point S1 at the rolling angle $\xi 1a$ engages with the workpiece for the first time, and remains in engagement up to the rolling angle $\xi 1b$. The cutting angle $\gamma$ is always negative; at the rolling angle $\xi 1a$ at which the point S1 engages for the first time, said cutting angle $\gamma$ has the value $\gamma 1a$, becomes more negative as the rolling angle increases, and reaches the numeric maximum $\gamma 1b$ thereof at that rolling angle at which the point S1 disengages from the workpiece again. The exact variation depends to a great extent on the specific circumstances (tool geometry and workpiece geometry, machine kinematics, etc.).

The point S2 comes into engagement only at a rolling angle $\xi 2a$, and remains in engagement up to a rolling angle $\xi 2b$. Herein $\xi 2a > \xi 1a$ and $\xi 2b > \xi 1b$. The cutting angle in this range varies from $\gamma 2a$ to $\gamma 2b$. Herein $|\gamma 2a| > |\gamma 1a|$ and $|\gamma 2b| > |\gamma 1b|$. In visual terms, the curve describing the cutting angle at the point S2 is displaced "to the right" (towards larger rolling angles) and "to the bottom" (towards more negative cutting angles).

Accordingly, the curve describing the cutting angle at the point S3 is displaced yet again further towards larger rolling angles and more negative cutting angles (thus $\xi 3a > \xi 2a > \xi 1a$, $\xi 3b > \xi 2b > \xi 1b$, $|\gamma 3a| > |\gamma 2a| > |\gamma 1a|$ and $|\gamma 3b| > |\gamma 2b| > |\gamma 1b|$).

The cutting angle thus depends on points S1, S2, S3 on the cutting edge 6, on the one hand, and the cutting angle at each of these points varies depending on the rolling angle, on the other hand. The cutting angle at each of said points reaches a different numeric maximum value $\gamma b$, specifically the numeric maximum value $\gamma 1b$ at the point S1, the numeric maximum value $\gamma 2b$ at the point S2, and the numeric maximum value $\gamma 3b$ at the point S3.

Figure 4:
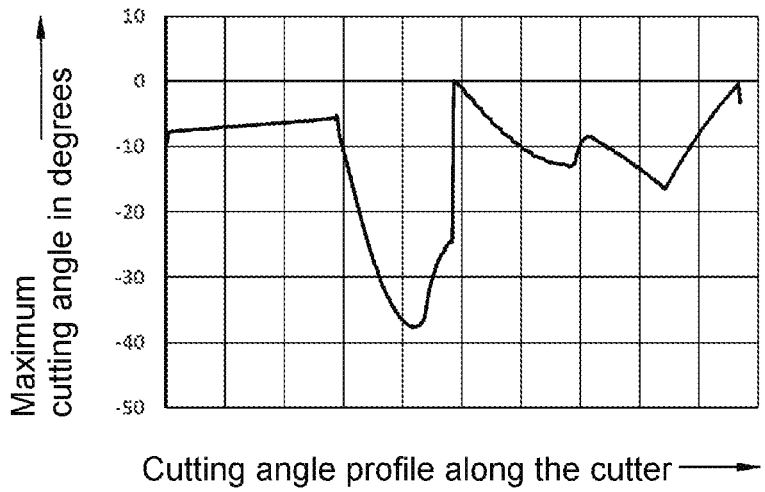
FIG. 4 shows a schematic illustration of a typical variation of the numeric maximum cutting angle along the cutting edge when hob peeling an external toothing having pre-machined teeth.
Figure 3A:
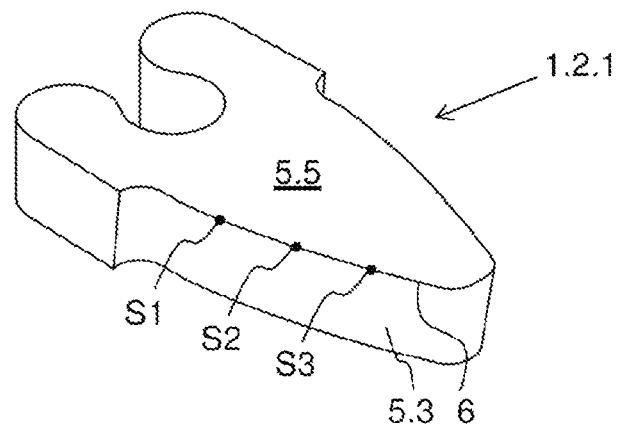
FIGS. 3($a$)-3($d$) shows in FIG. 5($a$) a cutting tooth without a cutting face chamfer, on which a plurality of points on the cutting edge are marked, and in FIGS. 5($b$)-5($d$) in each case one exemplary variation of the cutting angle γ as a function of the rolling angle ξ at each of these points on the cutting edge.
Figure 3B:
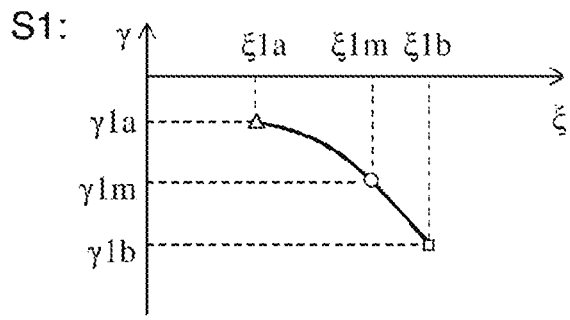
Figure 3C:
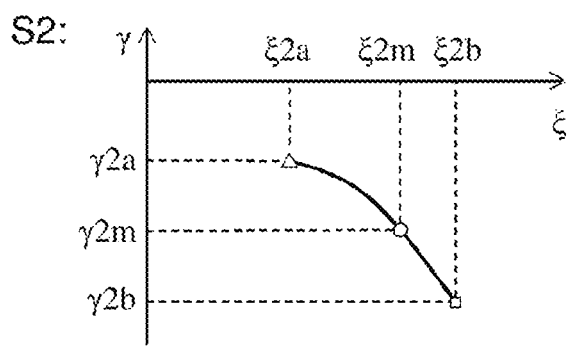
Figure 3D:
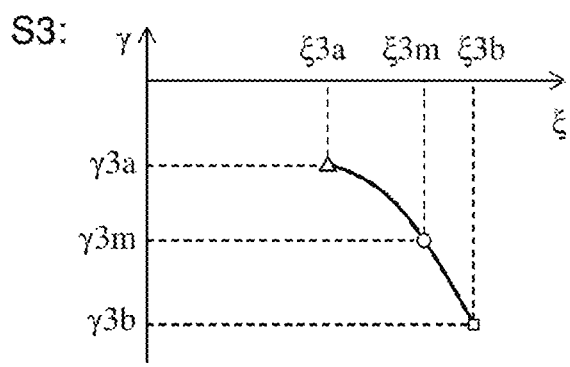
Figure 5A:
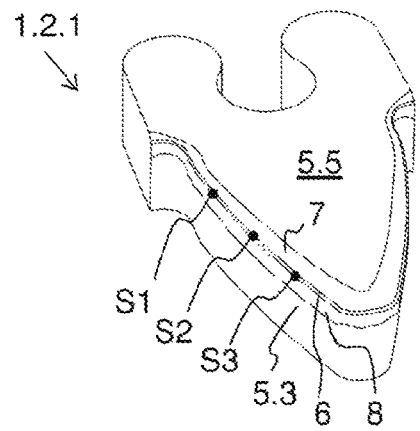
FIGS. 5($a$)-5($e$) shows in FIG. 5($a$) a cutting tooth having a variable cutting face chamfer, on which the same points on the cutting edge as in FIG. 3 are marked.
in FIG. 5(e) the variation of the numeric maximum original cutting angle, and of the numeric maximum chamfer cutting angle.
Figure 5B:
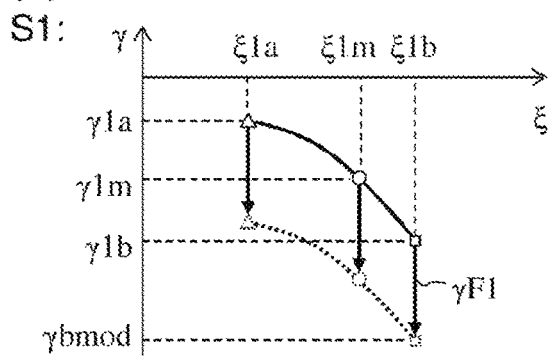
Figure 5E:
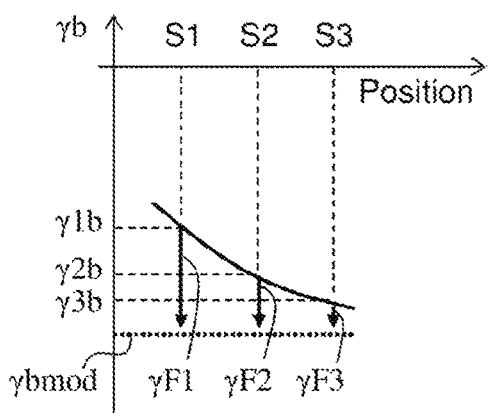
Figure 5C:
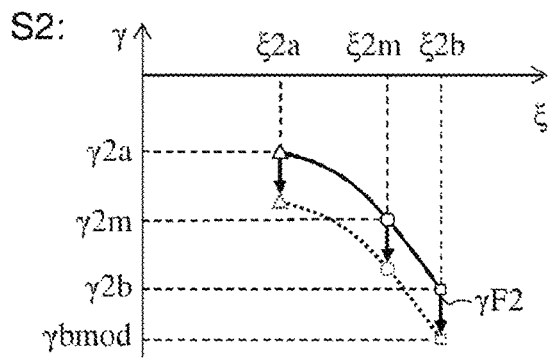
Figure 5D:
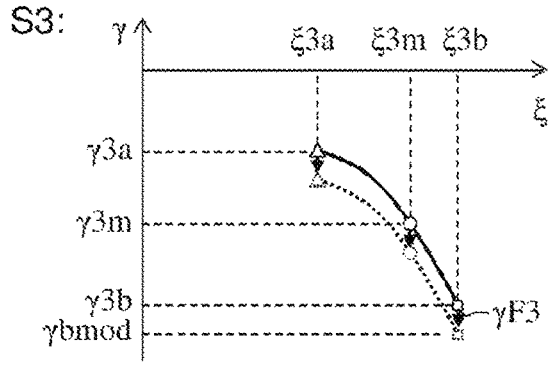

FIG. 4 illustrates a curve illustrating the variation of this numeric maximum value for a real cutting situation. It can be seen that the numeric maximum value on the incoming flank is initially almost constant, then becomes very negative in the tip region, drops to almost zero at the transition towards the outgoing flank, and again varies significantly on the outgoing flank. The exact cutting angle profile for a specific production situation depends heavily on various parameters, in particular on the tool geometry, on the workpiece geometry, on the toothing conditions (internal/external toothing, inclination angle), and on the machine kinematics. Said cutting angle profile can be computed using mathematical methods or 3D simulations, respectively. Suitable calculation methods are summarized in the dissertation by Kühlewein. While the specific variation of the cutting angle thus depends heavily on various factors, most variational profiles have in common that the numeric maximum value of the cutting angle varies heavily along the cutting edge.

Numeric maximum values for the cutting angle $\gamma$ that vary so heavily along the cutting edge are disadvantageous since they can lead to non-uniform wear on the tool, to a non-uniform machining result, and to great cyclic stress. The present invention therefore proposes for this variation to be smoothed, so to speak. It is illustrated in FIG. 5 how this can be achieved. As can be seen in the part (a) of FIG. 5, a cutting face chamfer 7 is now provided between the cutting face 5.5 and the cutting edge 6. The chamfer is characterized by a chamfer angle $\gamma F$, that is to say by the angle between the cutting face 5.5 and the cutting face chamfer 7 in the so-called normal plane of the tool cutting edge or the wedge measuring plane, as per DIN, that is to say in a plane which in the observed point of the cutting edge is perpendicular to the cutting edge. The chamfer angle $\gamma F$ varies along the length of the cutting edge. The chamfers on the cutting tooth are generally illustrated in a schematic and enlarged manner in the drawings. In reality, the chamfers have typical widths of at maximum a few hundred micrometres and therefore cannot be realistically illustrated in the figures.

In the present case, the chamfer angle $\gamma F$ steadily decreases between the points S1 and S3 such that $\gamma F1 > \gamma F2 > \gamma F3$. The cutting face chamfer 7 in all places is so wide that the chip runs of exclusively over the cutting face chamfer. To this end, the cutting face chamfer 7 is at least double the width of the chip thickness. On account thereof, the cutting face chamfer 7 in the removal of chips in a de-facto manner acts like the cutting face 5.5 has done previously. The chamfer cutting angle which is formed by machining the cutting face chamfer thus in a de-facto manner acts like the cutting angle. Said chamfer cutting angle therefore is also referred to as the de-facto cutting angle $\gamma 0$ in the following. The original cutting face 5.5 becomes a pure reference face which no longer has any direct influence on the chip-removal process. Moreover, a clearance face chamfer 8 is provided, and the cutting edge 6 is rounded by a radius; however, these aspects can be ignored for the time being.

It is illustrated in the parts (b) to (d) of FIG. 5 what effects the cutting face chamfer 7 has on the variation of the de-facto cutting angle. A de-facto cutting angle which is more negative by the respective chamfer angle $\gamma F$ than if no cutting face chamfer were present is generated at each of the points S1, S2, and S3. The curve illustrating the de-facto cutting angle (shown in punctiform lines) is thus displaced "to the bottom" in FIGS. 5(*b*) to 5(*d*) in relation to the curve illustrating the variation of the original cutting angle of FIGS. 3(b) to 3(d) (illustrated in solid lines) by the respective chamfer angle γF1, γF2 or γF3 (cf. the arrows in FIGS. 5(b) to 5(d)).

The chamfer angles γF1, γF2 and γF3 in the present example are selected such that the numeric maximum of the de-facto cutting angle at all three points S1, S2, and S3, becomes identical. This is illustrated in FIG. 5 (e). The variation of the numeric maximum value γb of the cutting angle is illustrated therein by way of solid lines for the situation of FIG. 3. The variation of the numeric maximum value of the de-facto cutting angle for the situation in FIG. 5 is illustrated by way of dashed lines. It can be seen that the numeric maximum value of the de-facto cutting angle is now identical at all three points S1, S2, and S3 on the cutting edge, and assumes the value γbmod. This has been achieved by accordingly varying the chamfer angle γF of the cutting face chamfer 7, in the present example decreasing the chamfer angle in a suitable manner from the base towards the tip of the cutting tooth.

In this way, the variation of the numeric maximum can be "smoothed" in a desired manner and can even be kept largely constant.

Instead of "smoothing" the profile of the numeric maximum or even keeping the latter constant, a suitable mean value of the cutting angle can also be formed for each point on the cutting edge, and the cutting face chamfer can be selected such that the mean value of the de-facto cutting angle varies to a lesser extent than in the absence of the cutting face chamfer, or even becomes constant. To this end, a mean value γ1m, γ2m or γ3m, respectively, which is assumed in each case at a rolling angle ξ1m, ξ2m or ξ3m, respectively, is indicated for each cutting point S1, S2, S3 in an exemplary manner in FIGS. 3(b) to 3(d) and 5(b) to 5(d). It is obvious that the selection of the chamfer angles illustrated leads to this mean value also becoming largely identical at all three points on the cutting edge S1, S3, S3.

A suitable weighting can be performed when forming the mean value. For example, the cutting angle at that rolling angle at which the respective point on the cutting edge engages for the first time can be weighted more heavily than the cutting angle at other rolling angles. In the extreme, the weighting assigns to the cutting angle for a specific value of the rolling angle the weighting 1, and assigns the weighting zero for all other values (the weighting thus representing a delta function, so to speak). For example, when only the numeric maximum of the cutting angle is assigned the weighting 1, and all other cutting angles are assigned the weighting zero, the formation of the mean value becomes equivalent to the selection of the numeric maximum of the cutting angle. To this extent, the weighted formation of the mean value described herein can be considered a generalization of the selection of the numeric maximum.

Only three points on the cutting edge have been selected in the examples above. Of course, these considerations can be generalized so as to apply to any number of points on the cutting edge.

FIGS. 6 and 7 show a hob peeling tool 1 having a multiplicity of cutting teeth. An exploded view of the tool 1 is illustrated in FIG. 8 which permits the construction of the tool to be seen even better. The tool has a gear-wheel shaped main body 1.1 and a multiplicity of cutting inserts 1.2 that are fastened to said main body 1.1 and will be described in more detail hereunder. The main body 1.1 has a central bore in the main body 1.1, having reference or base faces F1, F2, with which the tool is chucked on a spindle nose (known per se) of a hob peeling machine for rotation about a tool axis B1. The cutting inserts 1.2 by way of the cutting teeth thereof are positioned and fixed so as to be centric to the teeth of the main body 1.1. A positioning disk 1.5 serves for positioning the cutting inserts. The positioning disk, having the thickness Ds, at the external circumference thereof has positioning elements 1.5.1 which are configured so as to be complementary to corresponding holding elements of the cutting inserts, which will be described in more detail hereunder. The cutting inserts 1.2 with the aid of the positioning elements 1.5.1 and of the holding elements are disposed at the external circumference of the positioning disk 1.5 and define a tip circle diameter Dk. A form-fit in the radial direction and in the circumferential direction is configured herein between each holding element and the positioning disk 1.5. The cutting inserts 1.2 have a thickness that is somewhat greater than the thickness Ds of the positioning disk, so as to facilitate targeted post-machining of the cutting inserts. Said cutting inserts are connected to the main body 1.1 in a permanent and fixed manner by way of a connection layer 1.7. The connection layer 1.7 can be implemented by means of adhesive bonding, soldering/brazing, or other joining technologies. Said connection layer 1.7 has a thickness Dd.

A depression in the form of a turned feature to a depth of preferably about 0.03 to 0.05 millimetres can optionally be provided in the tooth tip region of the main body 1.1. The thickness Dd of the connection layer 1.7 in this region is thus increased by the same amount. This thicker part as a material and joint damper has a positive effect on the chip formation.

The connection layer is preferably electrically and thermally conductive. On account thereof, heat accumulation and disturbing accumulations of chips can be largely avoided when the tool 1 is cutting. Reasons for these phenomena lie in the intense friction on the cutting edge and the electrostatic charge that arises therefrom. Adhesives and solders which are suitable for these tasks are commercially available.

The final machining of the tool is performed only once the adhesive bonding or soldering/brazing, respectively, has been carried out. Herein, the reference faces F1, F2 on the main body for concentricity and axial runout are first post-machined. Thereafter, the cutting inserts 1.2 are machined to the final shape.

An RFID module 9 having sensors 10 is moreover indicated in FIG. 7. The RFID module 9 carries data pertaining to the tool geometry, in particular to the chamfer geometry of the cutting tooth 1.2, or a code (for example a serial number) which enables the respective data to be retrieved from a database. The sensors 10 measure the temperature, vibrations, and the impact sound. Said sensors 10 are operatively connected to the RFID module and the antenna system of the latter, and can be accessed in a non-contacting manner.

FIGS. 9 to 12, in a manner analogous to that of FIGS. 6 to 8, show the construction of a tool 1 having an additional gear-wheel shaped auxiliary disk 1.6. The latter is attached to the positioning disk 1.5 and to the cutting inserts 1.2 with the aid of a second connection layer 1.8, thereby covering in particular also at least a base region of the cutting teeth of the cutting inserts 1.2. The auxiliary disk 1.6 is additionally connected to the main body 1.1 by means of connection elements 1.9, thus enhancing the stability of the tool.

Figure 13:
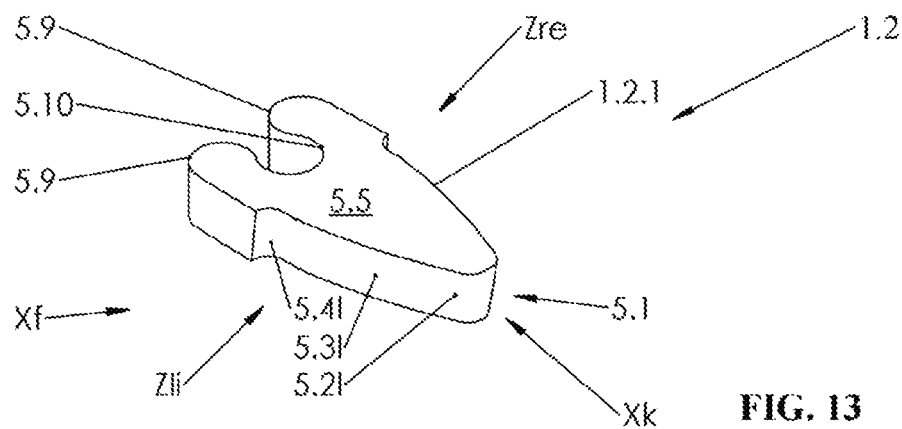
FIG. 13 shows a perspective view of a cutting insert blank comprising a single tooth, wherein the cutting face lies on the top and the parallel face thereto is at the bottom.

FIG. 13 shows a blank for a cutting insert 1.2. This cutting insert carries a single cutting tooth 1.2.1. The following regions of the cutting tooth are indicated: tooth tip Xk, tooth base Xf, left tooth flank Zli, right tooth flank Zre, cutting face 5.5, tip clearance face 5.1, left tip corner clearance face 5.2l, left main clearance face 5.3l, and left base clearance face 5.4*l*. The holding elements 5.9, already mentioned, which interact with the positioning elements 1.5.1 of the positioning disk 1.5 are disposed on the internal circumference of the blank. An arcuate region 5.10 lies between the holding elements 5.9.

Figure 14:
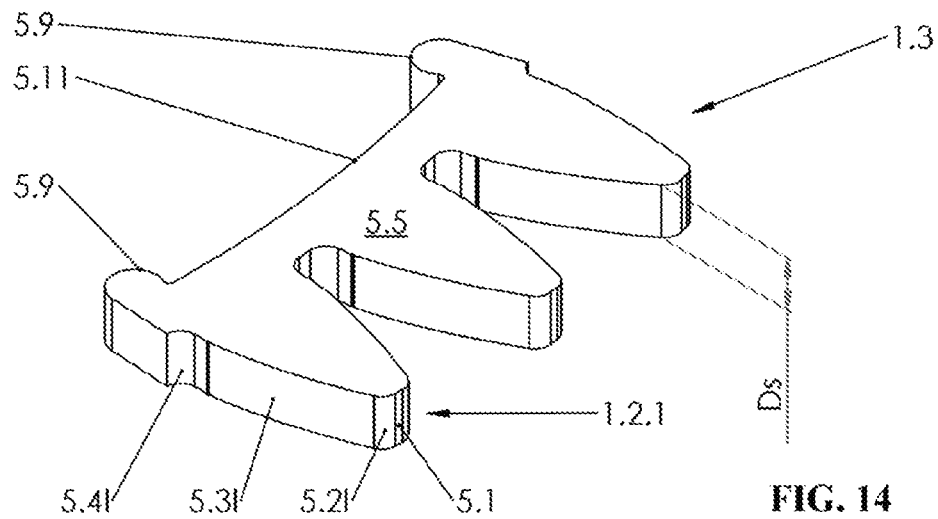
FIG. 14 shows a perspective view of a circular-arc shaped cutting insert segment blank comprising three cutting teeth, wherein the cutting face lies on the top.

While the cutting insert of FIG. 13 carries only a single cutting tooth, it is also conceivable for a plurality of cutting teeth to be configured on a single common cutting insert. FIG. 14 shows a blank for a cutting insert 1.3 which has the shape of an annular segment and carries three cutting teeth. Holding elements 5.9 are again disposed on the internal circumference of the blank, a circular segment 5.11 lying therebetween.

Figure 15:
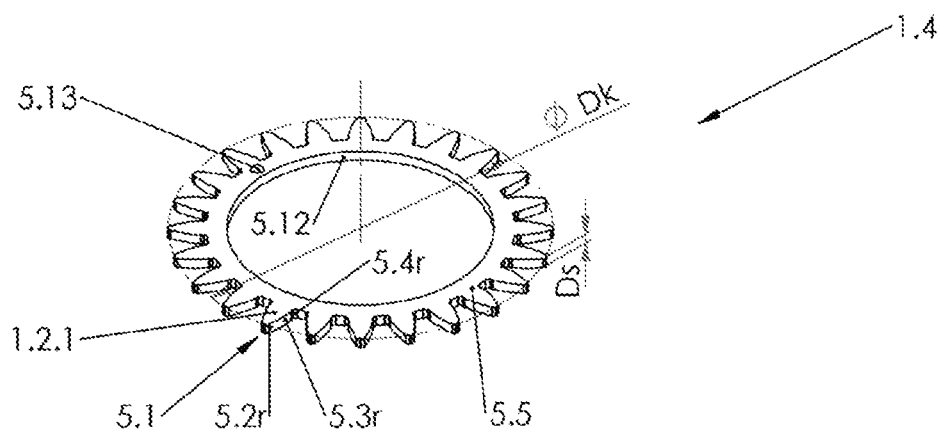
FIG. 15 shows a perspective view of a completely annular cutting insert blank comprising all cutting teeth, wherein the cutting face lies on the top.

FIG. 15 shows a blank for a cutting insert 1.4 which is completely annular and carries all cutting teeth of the tool. The internal circumference 5.12, a positioning aid 5.13, the tip circle diameter Dk, and the following clearance faces are additionally indicated: right tip corner clearance face 5.2*r*, right main clearance face 5.3*r*, and right base clearance face 5.4*r*. This form of the cutting insert is preferably employed for relatively small tools, for example having a tip circle diameter Dk<60 mm. By contrast, cutting inserts having single teeth according to FIG. 13, or segment-shaped cutting inserts having a limited tooth count according to FIG. 14, are preferred for tools having a Dk>60 mm Independently of the tooth count per cutting insert, the cutting inserts are preferably composed of ultra-hard materials such as, for example, hard metal with or without a coating, PCBN, CBN, or PCD. Said materials having a minimum oversize in relation to the final contour are cut from semi-finished products. The thickness of the cutting inserts is preferably 0.5 to 2 mm, and for cost reasons should not exceed 5 mm.

FIGS. 16 to 18 shows a cutting insert 1.2 having a single cutting tooth according to one embodiment of the present invention. The cutting tooth along the entire cutting edge 6 has a variable cutting face chamfer 7, a clearance face chamfer 8, and a variable radius R.

The cutting face 5.5, the cutting face chamfer 7, the clearance faces 5.1, 5.2*l*, 5.2*r*, 5.3*l*, 5.3*r*, 5.4*l*, 5.4*r*, the clearance face chamfer 8 and the radii R can be best characterized for each point on the cutting edge 6 in the respective normal plane of the tool cutting edge, that is to say in a cutting plane that is fixed in relation to the tool and which at the intersection point thereof with the cutting edge 6 is perpendicular on the cutting edge 6. Eight such planes are illustrated in an exemplary manner in FIG. 17. A first cutting plane E0 intersects the cutting edge 6 at the tooth tip. The further cutting planes are composed of one left and one right half-plane, wherein the half-planes are connected in the centre of the tooth and in general enclose an angle. In the example of FIG. 16, said half-planes are the left half-planes E1*l*, E2*l*, E3*l*, E4*l*, E5*l*, E6*l*, E7*l* and the right half-planes E1*r*, E2*r*, E3*r*, E4*r*, E5*r*, E6*r*, E7*r*. Each half-plane intersects the cutting edge 6 orthogonally. In practice, a higher number of cutting planes can be used, of course.

A cross-section through the cutting insert in the cutting plane E-E (corresponding to the half-planes E2*l*, E2*r*) is illustrated in FIG. 18. The cutting tooth by way of the top side thereof defines the cutting face 5.5. The latter runs orthogonally to the tool axis B1. The cutting tooth moreover defines a left main clearance face 5.3*l* and a right main clearance face 5.3*r*. These faces in relation to the tool axis B1 are inclined inwards such that the cutting tooth towards the bottom tapers in a wedge-shaped manner. The cutting tooth on the bottom side has a base face 5.6 which runs parallel with the cutting face 5.5 and serves as a joining face for connecting to the main body 1.1.

As part of the cutting face chamfer 7, a left cutting face chamfer 7.3*l* is provided along the left tooth flank on the cutting face 5.5. Said left cutting face chamfer 7.3*l* has a width Bli (in the standards mentioned, this width is also referred to as $b_{f\gamma}$) and in relation to the cutting face 5.5 is inclined at a chamfer angle γ1. The width Bli is selected such that the chip thickness in the hard fine machining is always smaller than the width Bli such that the chip runs off exclusively over the cutting face chamfer 7. The width Bli is preferably at least twice the chip thickness, or at least 100 micrometres. As part of the cutting face chamfer 7, a right cutting face chamfer 7.3*r* is configured on the cutting face 5.5 along the right tooth flank. Said right cutting face chamfer 7.3*r* has a width Bre which can be different from the width Bli, and a right chamfer angle γ2 which can be different from the left chamfer angle γ1.

Moreover, as part of the clearance face chamfer 8, a left clearance face chamfer 8.3*l* is provided on the left main clearance face 5.3*l*. Said clearance face chamfer 8.3*l* has a width bli (which in the standards mentioned is also referred to as $b_{f\alpha}$) and in relation to the left main clearance face 5.3*l* is inclined at an angle α1. Accordingly, as part of the clearance face chamfer 8, a right clearance face chamfer 8.3*r* is configured on the right main clearance face 5.3*r*. Said right clearance face chamfer 8.3*r* has a width bre, and in relation to the right main clearance face 5.3*r* is inclined at an angle α2. Both main clearance faces in relation to the tool axis B1 are inclined at an angle α.

The cutting edge 6 is configured between the cutting face chamfer 7 and the clearance face chamfer 8. In particular, a left main cutting edge 6.3*l* is formed between the left cutting face chamfer 7.3*l* and the left clearance face chamfer 8.3*l*. Accordingly, a right main cutting edge 6.3*r* is formed between the right cutting face chamfer 7.3*r* and the right clearance face chamfer 8.3*r*. The chamfer angles γ1, γ2, and the widths Bli, Bre of the cutting face chamfers vary continuously along the cutting edge 6. The cutting edge 6 herein lies in a plane Es which runs below the cutting face 5.5 and parallel with the latter.

In the embodiment of FIGS. 16 to 18, the width Bli of the left cutting face chamfer 7.3*l* increases continuously along the left tooth flank, from the tooth tip Xk to the tooth base Xf. The chamfer angle γ1 between the left cutting face chamfer 7.3*l* and the cutting face 5.5 decreases continuously from the tooth tip Xk to the tooth base Xf. By contrast, the conditions are completely reversed along the right tooth flank: The width Bre of the right cutting face chamfer 7.3*r* decreases slightly but continuously along the right tooth flank, from the tooth tip Xk to the tooth base Xf. By contrast, the chamfer angle γ2 between the right cutting face chamfer 7.3*r* and the cutting face 5.5 increases slightly from the tooth tip Xk to the tooth base Xf. The cutting edge 6 is rounded by a radius R, wherein this radius is preferably conceived having values between 10% and 40% of the chip thickness that is to be mathematically expected.

At the tooth tip, the cutting face chamfers 7.2*l*, 7.2*r*, and 7.1 that are located there continuously connect to the cutting face chamfers 7.3*l* and 7.3*r* along the flanks. The same is true for the cutting face chamfers 7.4*l*, 7.4*r* at the tooth base. The boundary curve 7.5 of the cutting face chamfer 7 is plotted. Said boundary curve 7.5 delimits the cutting face or reference face in relation to the various cutting face chamfers.

Figure 19:
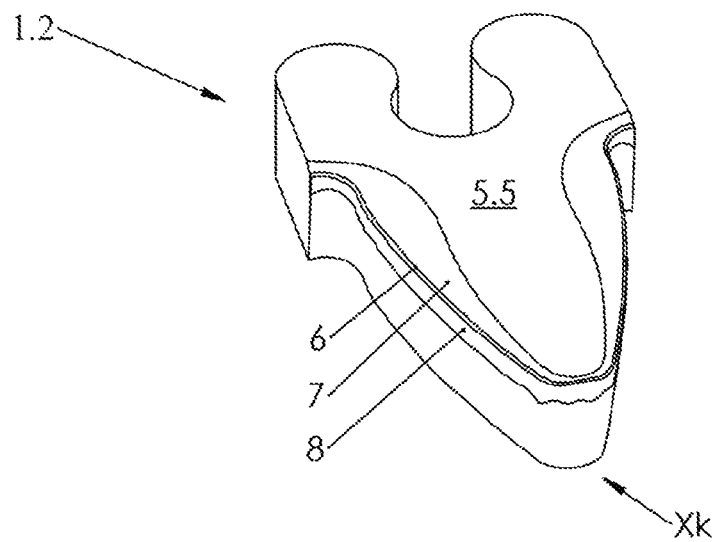
FIG. 19 shows a perspective view of a cutting insert comprising a single tooth, wherein cutting face chamfers having an increasing width and also clearance face chamfers are provided along both tooth flanks.
Figure 20:
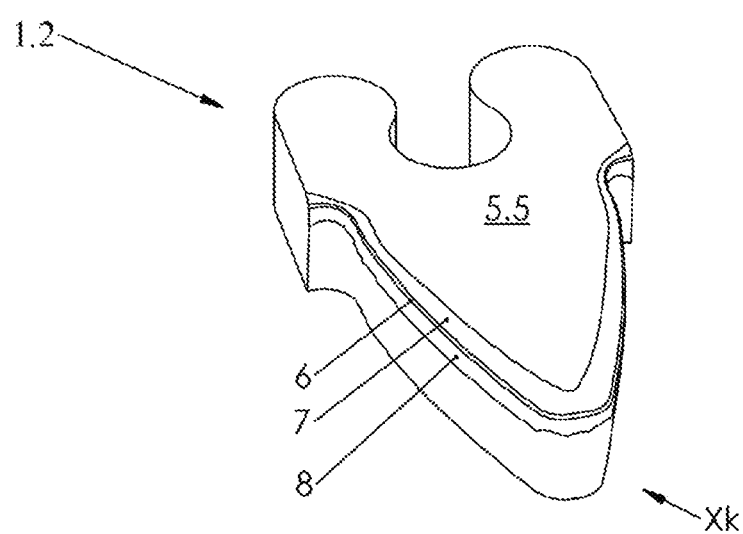
FIG. 20 shows a perspective view of a cutting insert comprising a single tooth, wherein cutting face chamfers having an decreasing width and also clearance face chamfers are provided along both tooth flanks.

Further variants are shown in an exemplary manner in FIGS. 19 and 20. The widths Bli, Bre of the cutting face chamfers 7 in the embodiment of FIG. 19 increase continuously along both the left as well as the right tooth flank, from the tooth tip Xk to the tooth base Xf, while said widths Bli, Bre in FIG. 20 decrease continuously along the two flanks. Accordingly, the chamfer angles γ1 and γ2 of the cutting face chamfers 7 in FIG. 19 decrease continuously from the tooth tip Xk to the tooth base Xf, while said chamfer angles γ1 and γ2 continuously increase in FIG. 20.

Figure 21:
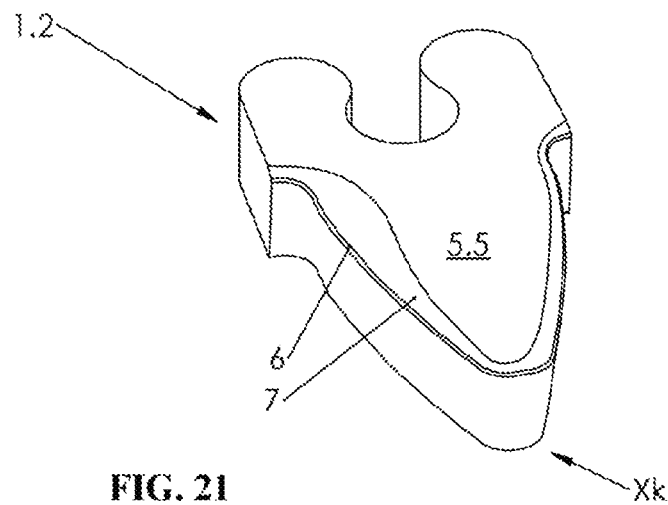
FIG. 21 shows a perspective view of a cutting insert comprising a single tooth, wherein a cutting face chamfer having an increasing width is provided along one tooth flank, and a cutting face chamfer having a decreasing width is provided along the other tooth flank, and no clearance face chamfers are provided.
Figure 22:
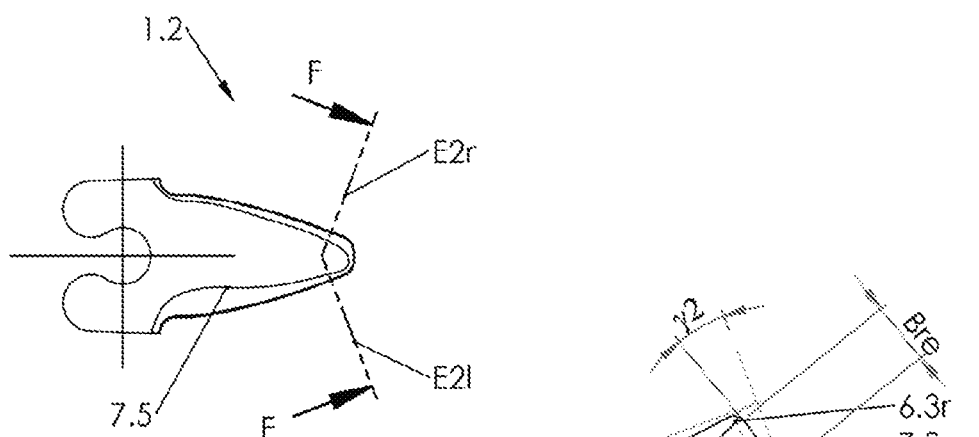
FIG. 22 shows a plan view of the cutting face of a cutting insert as per FIG. 21.
Figure 23:
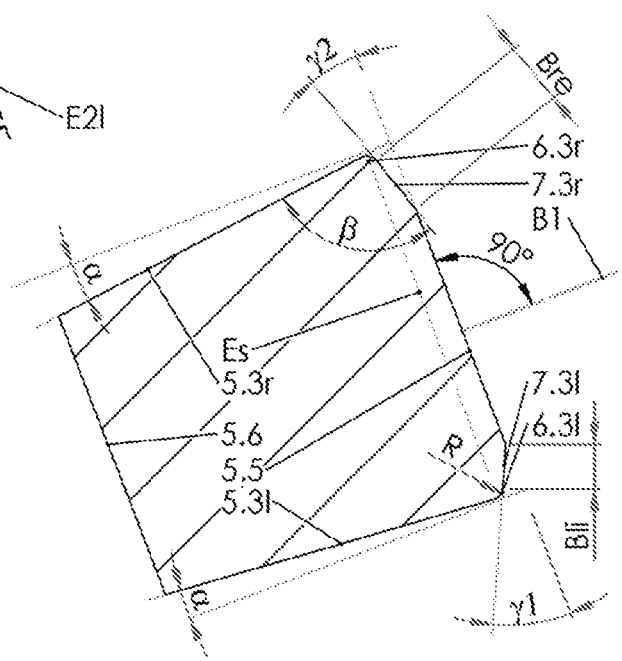
FIG. 23 shows an enlarged sectional view of the cutting insert in the plane F-F of FIG. 22, enabling in particular the cutting face chamfer to be better seen.

FIGS. 21 to 23 in various views and in an exemplary manner show a variant in which no clearance face chamfer 8 is present. This variant otherwise corresponds to the embodiments of FIGS. 16 to 18. The cutting edge 6 here is configured between the cutting face chamfer and the clearance face.

The invention has been explained above by means of exemplary embodiments. Of course, a multiplicity of modifications can be performed without departing from the scope of the invention.

For instance, the holding elements and the positioning elements that are complementary to the former for positioning the cutting inserts can also be designed in a different manner. Positioning elements can also be configured directly on the main body instead of on a positioning disk. The holding elements do not need to engage with the positioning elements in a form-fit; it can also suffice for said holding elements to serve as pure positioning aids.

LIST OF REFERENCE SIGNS

1 Hob peeling tool
1.1 Main body
1.2. Cutting insert comprising a single tooth
1.2.1 Cutting tooth
1.3 Cutting insert in the form of an annular segment
1.4 Cutting insert as a complete annulus comprising all cutting teeth
1.5 Positioning disk
1.5.1 Positioning element
1.6 Auxiliary disk
1.7 Connection layer and damping layer
1.8 Connection layer
1.9 Connection element
2 Workpiece having a toothing
3 CNC control unit
4 Operator panel
5.1 Tip clearance face
5.2l, 5.2r Tip corner clearance face left, tip corner clearance face right
5.3l, 5.3r Main clearance face left, main clearance face right
5.4l, 5.4r Base clearance face left, base clearance face right
5.5 Cutting face
5.6 Base face
5.9 Holding element
5.10 Arcuate region
5.11 Circular segment
5.12 Internal circumference
5.13 Positioning aid
6 Cutting edge
6.3l Left main cutting edge
6.3r Right main cutting edge
7 Cutting face chamfer
7.1 Cutting face chamfer, tip cutting edge
7.2l, 7.2r Cutting face chamfer, left tip corner; cutting face chamfer, right tip corner
7.3l, 7.3r Cutting face chamfer, left main cutting edge; cutting face chamfer, right main cutting edge
7.4l, 7.4r Cutting face chamfer, left base cutting edge; cutting face chamfer, right base cutting edge
7.5 Boundary curve between cutting face chamfer and cutting face
8 Clearance face chamfer
8.1 Clearance face chamfer, tip cutting edge
8.2l, 8.2r Clearance face chamfer, left tip corner; clearance face chamfer, right tip corner
8.3l, 8.3r Clearance face chamfer, left main cutting edge; clearance face chamfer, right main cutting edge
8.4l, 8.4r Clearance face chamfer, left base cutting edge; clearance face chamfer, right base cutting edge
9 RFID module having an antenna
10 Sensors for temperature, vibrations and impact sound
A . . . F Detail or sectional area, or fragment, respectively, in the figures
Bli Width of the cutting face chamfer, left tooth flank
Bre Width of the cutting face chamfer, right tooth flank
bli Width of the clearance face chamfer, left tooth flank
bre Width of the clearance face chamfer, right tooth flank
B1 Rotation axis of the tool spindle (tool axis)
Bx Tool reference plane in the X-direction
By Tool reference plane in the Y-direction
Cx Workpiece reference plane in the X-direction
Cy Workpiece reference plane in the Y-direction
C1 Rotation axis of the workpiece spindle (workpiece axis)
Ds Thickness of the cutting insert
Dd Increased thickness of the connection and damping layer
Dk Tip circle diameter of the tool
E1l . . . E7l, E0 Cutting planes, to the left of, and centric and perpendicular to the cutting edges
E1r . . . E7r Cutting planes, to the right of and perpendicular to the cutting edges
Es Plane parallel with the cutting face in which the cutting edges lie
F1, F2, F3 Reference faces on the tool
R Radius
S1, S2, S3 Points on the cutting edge
Xk Tooth tip region
Xf Tooth base region
Z1 Axial feed motion
Zli Left tooth flank
Zre Right tooth flank
α Relief angle
α1 Chamfer relief angle, left tooth flank
α2 Chamfer relief angle, right tooth flank
β Wedge angle
65 Cutting angle
γ0 De-facto cutting angle
γ1 Chamfer angle, left tooth flank
γ2 Chamfer angle, right tooth flank
γ1a, γ2a, γ3a Cutting angle upon initial engagement
γ1b, γ2b, γ3b Cutting angle upon completed engagement
γ1m, γ2m, γ3m Weighted mean values of the cutting angle
γF Chamfer angle
γF1, γF2, γF3 Chamfer angle
γbmod Numeric maximum value of the chamfer cutting angle
Σ1 Tool adjustment angle in relation to the plane Cx
ξ Rolling angle
ξ1a, ξ2a, ξ3a Rolling angle upon initial engagement
ξ1b, ξ2b, ξ3b Rolling angle upon completed engagement
ξ1m, ξ2m, ξ3m Rolling angles at which weighted mean values are achieved

The invention claimed is:
1. A tool for hob peeling workpieces having pre-machined teeth, comprising:

a gear-wheel shaped main body which defines a tool axis and which on an end face defines a tip circle, and one or a plurality of cutting inserts which are disposed on the main body at the end face in the region of the tip circle, wherein each of the cutting inserts comprises at least one cutting tooth, the cutting tooth forming a cutting edge which runs at least along one flank of the cutting tooth from a tooth tip to a tooth base of the cutting tooth, and wherein the cutting tooth has a cutting face associated with the cutting edge, and a clearance face associated with the cutting edge, wherein the cutting face along the cutting edge has a cutting face chamfer which in relation to the cutting face is inclined by a chamfer angle, wherein the chamfer angle varies along the cutting edge, and wherein the cutting face chamfer is configured such that chips which form during the passage of the cutting edge through a tooth gap of a workpiece run off exclusively by way of the cutting face chamfer when the workpiece is rotated about a workpiece axis and the tool is rotated about a tool axis in a rolling engagement with the workpiece, the tool in relation to the workpiece axis being aligned in a skewed manner, the cutting face acting only as a reference face.

2. The tool according to claim 1, wherein the chamfer angle along the cutting edge continuously increases or decreases from the tooth tip to the tooth base.

3. The tool according to claim 1, wherein the cutting face chamfer has a width of at least 50 micrometres.

4. The tool according to claim 1, wherein the cutting face chamfer has a width which varies along the cutting edge.

5. The tool according to claim 4, wherein the width of the cutting face chamfer along the cutting edge continuously increases or continuously decreases from the tooth tip to the tooth base.

6. The tool according to claim 1, wherein the cutting edge of the cutting tooth is rounded by a radius.

7. The tool according to claim 1, wherein the cutting faces of all cutting teeth are disposed in one common plane, wherein the common plane runs so as to be orthogonal to the tool axis.

8. The tool according to claim 1, wherein the cutting inserts are integrally bonded to the main body under the formation of a connection layer.

9. The tool according to claim 8, wherein the connection layer in the region of the tooth tip of each cutting tooth is configured so as to be thicker than in the region of the tooth base.

10. The tool according to claim 9, wherein the main body in the region of the tip circle thereof has a depression in its end face, and wherein the connection layer extends into a region of the depression.

11. The tool according to claim 8,
wherein the tool comprises a positioning disk which on the external circumference thereof has positioning elements;
wherein the cutting inserts are disposed at the external circumference of the positioning disk; and
wherein the cutting inserts on their inside are provided with holding elements which are configured so as to be complementary to the positioning elements and in relation to a radial and/or tangential direction establish a form-fit between the positioning disk and the cutting inserts.

12. The tool according to claim 8,
wherein the tool comprises a gear-wheel shaped auxiliary disk;
wherein the cutting inserts are disposed axially between the main body and the auxiliary disk; and
wherein the cutting inserts are integrally bonded to both the main body as well as to the auxiliary disk.

13. The tool according to claim 1, wherein each cutting insert has a circular-arc shape and has a plurality of cutting teeth, wherein the cutting teeth are disposed on the cutting insert at its external circumference along a circular-arc segment, and wherein the cutting inserts in total form an annulus.

14. The tool according to claim 1, wherein the tool comprises a single annular cutting insert, wherein the cutting teeth are disposed on the cutting insert at its external circumference.

15. The tool according to claim 1, wherein an RFID module is disposed in or on the main body, said RFID module being provided with a memory,
wherein an identification code for unequivocally identifying the tool is stored in the memory; and/or
wherein data pertaining to the tool geometry is stored in the memory and is retrievable from the memory and/or is modifiable in the memory in a non-contacting manner; and/or
wherein the RFID module carries at least one sensor for detecting temperature, vibrations or impact sounds, said sensor being accessible and/or actuatable in a non-contacting manner.

16. A method for producing a tool for hob peeling workpieces having pre-machined teeth as claimed in claim 1, the method comprising:
providing a gear-wheel shaped main body which defines a tool axis and which on an end face defines a tip circle, and one or a plurality of cutting inserts, which are disposed on the main body at the end face in the region of the tip circle, wherein each of the cutting inserts comprises at least one cutting tooth, the cutting tooth forming a cutting edge which runs at least along one flank of the cutting tooth from a tooth tip to a tooth base of the cutting tooth, and wherein the cutting tooth has a cutting face associated with the cutting edge, and a clearance face associated with the cutting edge, wherein the cutting inserts are integrally bonded to the main body at the end face,
wherein the cutting inserts, after being attached to the main body, are finally machined to provide the cutting face along the cutting edge with a cutting face chamfer which in relation to the cutting face is inclined by a chamfer angle, wherein the chamfer angle varies along the cutting edge, and
wherein the cutting face chamfer is configured such that chips which form during the passage of the cutting edge through a tooth gap of a workpiece run off exclusively by way of the cutting face chamfer when the workpiece is rotated about a workpiece axis and the tool is rotated about a tool axis in a rolling engagement with the workpiece, the tool in relation to the workpiece axis being aligned in a skewed manner, the cutting face acting only as a reference face.

17. A method for fine machining a workpiece having pre-machined teeth by hob peeling, the method comprising:
rotating a workpiece about a workpiece axis;
rotating a tool about a tool axis in a rolling engagement with the workpiece, the tool in relation to the workpiece axis being aligned in a skewed manner, wherein the rolling engagement defines a rolling angle;

wherein the tool is fed axially in a direction that is parallel or antiparallel with the workpiece axis;

wherein the tool comprises a gear-wheel shaped main body which defines a tool axis and which on an end face defines a tip circle, and one or a plurality of cutting inserts which are disposed on the main body at the end face in the region of the tip circle, wherein each of the cutting inserts comprises at least one cutting tooth, the cutting tooth forming a cutting edge which runs at least along one flank of the cutting tooth from a tooth tip to a tooth base of the cutting tooth, and wherein the cutting tooth has a cutting face associated with the cutting edge, and a clearance face associated with the cutting edge;

wherein the cutting face of each cutting tooth along the cutting edge has a cutting face chamfer which in relation to the cutting face is inclined by a chamfer angle, wherein the chamfer angle varies along the cutting edge; and wherein the cutting face chamfer is configured such that chips which form during the passage of the cutting edge through a tooth gap of the workpiece run off exclusively by way of the cutting face chamfer, the cutting face acting only as a reference face.

18. The method according to claim 17, wherein the chamfer angle varies along the cutting edge in such a manner that, during the passage of the cutting edge through the tooth gap, a chamfer cutting angle in relation to the cutting face chamfer is formed at each point of the cutting edge, the chamfer cutting angle acting as a de-facto cutting angle;

wherein the chamfer cutting angle at each point on the cutting edge depends on the rolling angle during the passage of the cutting edge through the tooth gap; and wherein the chamfer angle varies along the cutting edge in such a manner that a reference value of the chamfer cutting angle as calculated in each case at a fixed point of the cutting edge throughout the passage of the cutting edge through the tooth gap varies to a lesser extent along the cutting edge than in the absence of the cutting face chamfer.

19. The method according to claim 18, wherein the chamfer angle varies along the cutting edge in such a manner that the chamfer cutting angle is negative along the entire cutting edge, and the numeric maximum value of said chamfer cutting angle is in the range from −5° to −40°.

20. The method according to claim 17, wherein the cutting face chamfer along the entire cutting edge has a width which is larger than the maximum thickness of the chips that form during the passage of the cutting edge through the tooth gap.

21. A method of hard fine machining of a workpiece having pre-machined teeth, comprising hob peeling the workpiece using a tool according to claim 1.

22. The tool according to claim 6, wherein the radius is at least 15 micrometres.

23. The tool according to claim 6, wherein the radius increases from the tooth base to the tooth tip.

24. The tool according to claim 10, wherein the depression has a depth of 30 to 50 micrometres.

25. The tool according to claim 12, wherein the cutting inserts are adhesively bonded or brazed to both the main body as well as to the auxiliary disk.

26. The tool according to claim 15, wherein the data pertaining to the tool geometry comprises data pertaining to the geometry of the cutting face chamfer.

27. The method according to claim 19, wherein the numeric maximum value of said chamfer cutting angle is in the range from −20° to −35°.

28. The method according to claim 17, wherein the cutting face chamfer along the entire cutting edge has a width which is at least two times larger than the maximum thickness of the chip that forms during the passage of the cutting edge through a tooth gap of the workpiece.

29. The tool according to claim 1, wherein the chamfer angle varies along the cutting edge in such a manner that, during the passage of the cutting edge through the tooth gap, a chamfer cutting angle in relation to the cutting face chamfer is formed at each point of the cutting edge, the chamfer cutting angle acting as a de-facto cutting angle, the chamfer cutting angle at each point on the cutting edge depending on a rolling angle during the passage of the cutting edge through the tooth gap; and wherein the chamfer angle varies along the cutting edge in such a manner that a reference value of the chamfer cutting angle as calculated in each case at a fixed point of the cutting edge throughout the passage of the cutting edge through the tooth gap varies to a lesser extent along the cutting edge than in the absence of the cutting face chamfer.

30. The tool according to claim 29, wherein the chamfer angle varies along the cutting edge in such a manner that the chamfer cutting angle is negative along the entire cutting edge, and the numeric maximum value of said chamfer cutting angle is in the range from −5° to −40°.

31. The tool according to claim 1, wherein the cutting face chamfer along the entire cutting edge has a width which is larger than the maximum thickness of the chips that form during the passage of the cutting edge through the tooth gap.

* * * * *